No. 859,175. PATENTED JULY 2, 1907.
P. GLOWACKI.
CULTIVATOR FOR SUGAR BEETS.
APPLICATION FILED APR. 26, 1906.

3 SHEETS—SHEET 1.

Witnesses
Inventor
Paul Glowacki

No. 859,175. PATENTED JULY 2, 1907.
P. GLOWACKI.
CULTIVATOR FOR SUGAR BEETS.
APPLICATION FILED APR. 26, 1906.

3 SHEETS—SHEET 2.

No. 859,175. PATENTED JULY 2, 1907.
P. GLOWACKI.
CULTIVATOR FOR SUGAR BEETS.
APPLICATION FILED APR. 26, 1906.
3 SHEETS—SHEET 3.
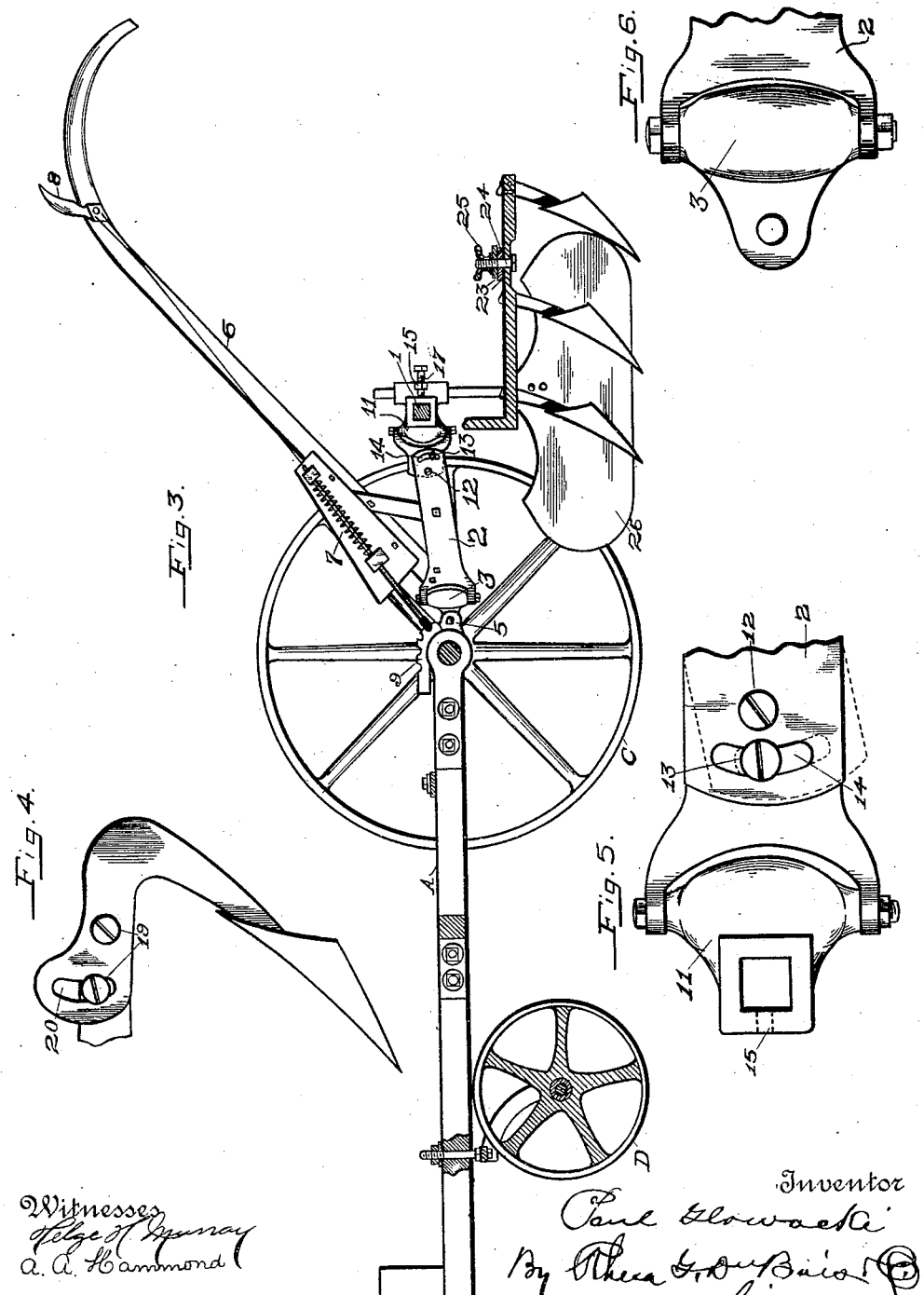

UNITED STATES PATENT OFFICE.

PAUL GLOWACKI, OF THORP, WISCONSIN.

CULTIVATOR FOR SUGAR-BEETS.

No. 859,175.  Specification of Letters Patent.  Patented July 2, 1907.

Application filed April 26, 1906. Serial No. 313,858.

*To all whom it may concern:*

Be it known that I, PAUL GLOWACKI, a citizen of the United States, residing at Thorp, in the county of Clark and State of Wisconsin, have invented certain new and useful Improvements in Cultivators for Sugar-Beets, of which the following is a specification.

My invention relates to an improvement in cultivators, for sugar beets more particularly, as well as for other crops and the object is to provide a cultivator the working parts of which may be easily raised and lowered as well as swung to the right or left thereby enabling the operator to get closer to the crops when small.

Another object is to make provision not only for cultivating but also for pulling up the weeds as well as covering them beneath the dirt.

With these objects in view, my invention consists in certain novel features of construction and combinations of parts which will be hereinafter described and pointed out in the claims.

Figure 1:
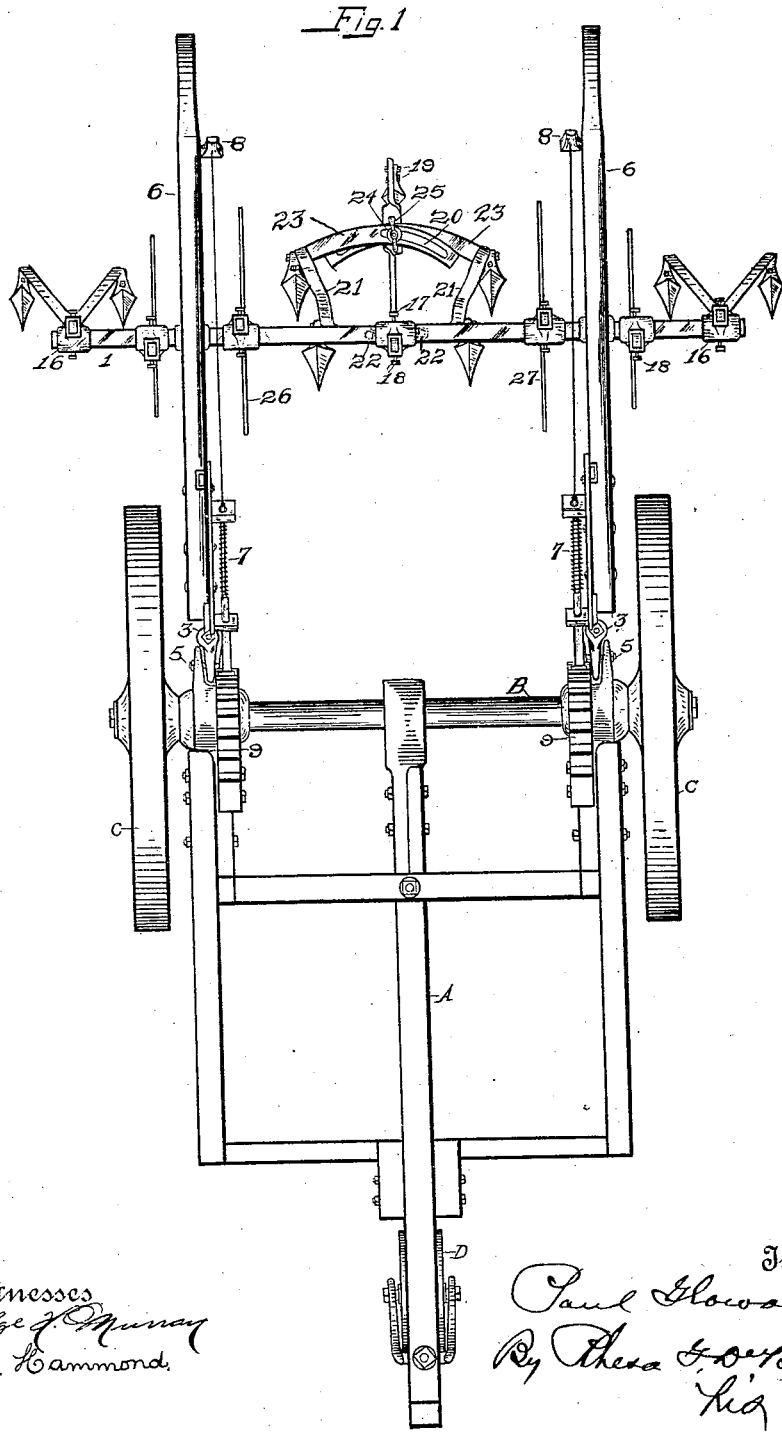
Figure 2:
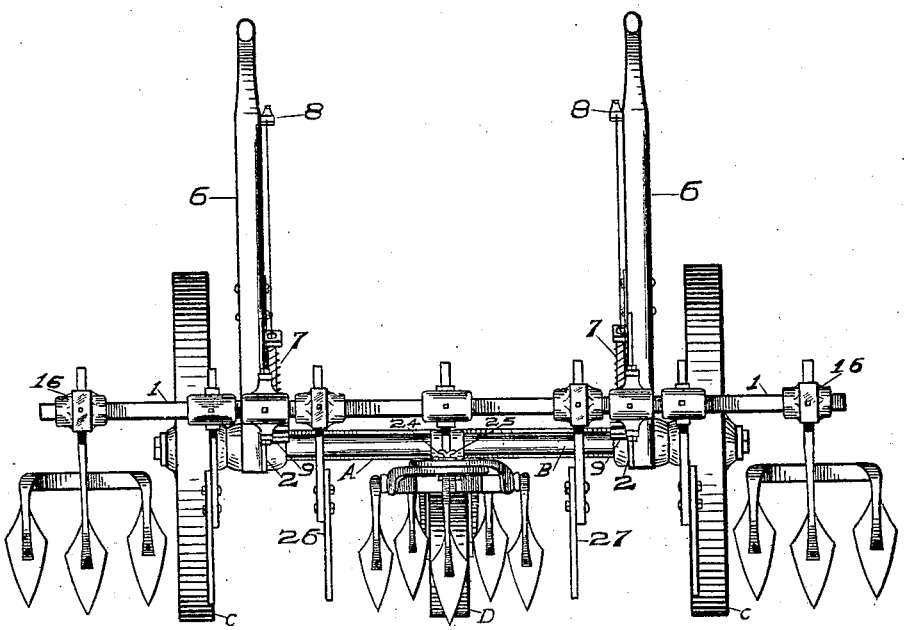
Figure 7:
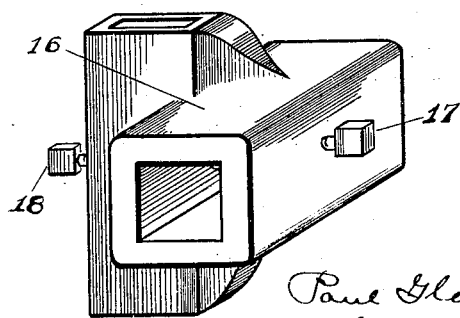

In the accompanying drawings, Figure 1 is a plan view, Fig. 2 is a rear elevation, Fig. 3 is a vertical, longitudinal section, and Figs. 4, 5 and 6 are details.

A, represents the cultivator frame, B, the axle, C, C, the usual wheels in which the ends of the axle are supported.

D, is a caster wheel at the forward end of the frame.

The cultivator blades and guards are all connected with an angular bar 1, which is arranged back of the axle and parallel therewith. This bar is connected with the frame of the cultivator preferably in the following manner. Plates 2, 2, are pivotally connected at their forward ends to the knuckles 3, 3, whereby the plates may be turned laterally, and these knuckles are pivotally connected with the frame by means of bolts 5, 5, whereby the plates may be raised and lowered. Handles 6, 6, are provided for this purpose, they being secured at their lower ends to these plates 2, 2, suitably braced and the outer ends of the handle extending within reach of the operator, and by means of them he is enabled to raise and lower the bar with its attached cultivators and guards or swing them either to the right or to the left. Spring actuated latches 7, 7, are connected with the handles they being operated by hand levers 8, 8, and working in toothed segments 9, 9, secured to the frame of the cultivator in the vicinity of the axle, these segments being provided as a means for locking the plates 2, 2, with the bar 1, and its attached cultivator blades and guards, either in an elevated or lowered position.

The bar 1, is preferably connected with the rear ends of the plates 2, 2, by means of knuckles 11, 11, pivoted as at 12, 12, to said plates, the bolts 13, 13, operating in slots 14, 14, being provided as a means for adjusting the bar and slightly rocking it axially with respect to the bolts to regulate the inclination of the cultivator blades and guards. These knuckles are pivotally connected at their rear ends to the bolts 13, 13, in which the bar 1 is held by set screws 15, 15.

Various forms of cultivators may be employed but I have shown three sets, namely one gang in the center and smaller ones at the ends. These are preferably held by socket clips 16, 16, on the bar 1 by set screws 17, 17, and the shanks of the cultivator gangs are vertically adjustable therein by working through slots in these clips where they are held by set screws or bolts 18, 18. The center gang is capable of adjustment, each blade being capable of being swung on a pivot and adjusted through the medium of bolts 19, and slots 20, and they may be swung apart to aid the gang through the medium of the side frames 21, 21, pivoted as at 22, at their forward ends to the sides of the shank and having lateral slotted plates 23, 23, which are held by a bolt and thumb nut 24 and 25 respectively, working in said slots. Guard plates 26 and 27 are likewise adjustably held on the bar 1, pivoted laterally and vertically as are the cultivator gangs and hence this construction need not be further described. The inner guard plates are preferably somewhat longer than the outer ones, and in cultivating two rows of plants which this cultivator is intended to do, these guard plates are made to straddle the rows, thus preventing the dirt cultivated by the gangs from burying the plants while at the same time throwing it back more or less to cover the weeds as they are pulled up and the dirt is stirred and cultivated.

From the foregoing it will be seen that I have devised a simple means for cultivating the sugar beet plant as well as other plants and I provide as it were, universal joint connections between the cultivators and the frame of the cultivator whereby the gangs of cultivators are made easily controllable and sensitive to the wish of the operator so that they may be forced deeper into the soil or pulled out or moved to one side or the other without stopping the horse. Furthermore I provide means for varying the inclination of the cultivators collectively as well as individually and likewise for raising or lowering them individually as well as collectively, and all of this is accomplished by simple mechanism as hereinbefore described.

Slight changes might be resorted to in the form and arrangement of the several parts described without departing from the spirit and scope of my invention, and hence I do not wish to limit myself to the exact construction herein set forth, but:

Having fully described my invention, what I claim as new and desire to secure by Letters Patent, is:

1. In a cultivator, the combination with a frame supported on suitable wheels, of plates and handles connected with the plates capable of swinging vertically and laterally and a bar having hinged connection with the plates, said bar carrying gangs of cultivator teeth.

2. In a cultivator, the combination with a frame supported on suitable wheels, of plates and handles connected with the plates capable of swinging vertically and laterally and a bar having hinged connection with the plates, said bar carrying gangs of cultivator teeth, and guard plates or fenders.

3. In a cultivator, the combination with a frame supported on suitable wheels, of plates and handles connected with the plates capable of swinging vertically and laterally and a bar having hinged connection with the plates, said bar carrying gangs of cultivator teeth, and means for adjusting said gangs of cultivator teeth.

4. In a cultivator, the combination with a frame supported on suitable wheels, of plates and handles connected with the plates and capable of swinging vertically and laterally, and a bar having hinged connection with the plates, said bar carrying gangs of cultivator teeth, and means for varying the axial relation of the bar to the plates.

5. In a cultivator, the combination with a frame supported on suitable wheels, of plates and handles connected with the plates and capable of swinging vertically and laterally, and a bar having hinged connection with the plates, said bar carrying gangs of cultivator teeth and guard plates or fenders, and means for varying the axial relation of the bar to the plates.

In testimony whereof I affix my signature in presence of two witnesses.

PAUL GLOWACKI.

Witnesses:
FRANK SWITALSKI,
WISUT TZYCLOSCK.